United States Patent
Irving et al.

(10) Patent No.: US 9,235,868 B2
(45) Date of Patent: Jan. 12, 2016

(54) METHOD AND SYSTEM FOR INTERACTIVE, MULTI-USER ELECTRONIC DATA TRANSMISSION IN A MULTI-LEVEL MONITORED AND FILTERED SYSTEM

(75) Inventors: John Irving, Ottowa (CA); Marcello Bursztein, Ottowa (CA); Steve Mulligan, Ottowa (CA); Patrick Lajeunesse, Ottowa (CA); Pierre Killeen, Ottawa (CA)

(73) Assignee: Cricket Media, Inc., Herndon, VA (US)

( * ) Notice: Subject to any disclaimer, the term of this patent is extended or adjusted under 35 U.S.C. 154(b) by 226 days.

(21) Appl. No.: 12/105,254

(22) Filed: Apr. 17, 2008

(65) Prior Publication Data

US 2008/0319949 A1 Dec. 25, 2008

Related U.S. Application Data

(63) Continuation of application No. 10/619,098, filed on Jul. 14, 2003, now abandoned.

(60) Provisional application No. 60/395,405, filed on Jul. 13, 2002.

(51) Int. Cl.
 *G06F 15/16* (2006.01)
 *G06Q 50/20* (2012.01)
 *G06Q 10/10* (2012.01)

(52) U.S. Cl.
 CPC .............. *G06Q 50/205* (2013.01); *G06Q 10/10* (2013.01)

(58) Field of Classification Search
 None
 See application file for complete search history.

(56) References Cited

U.S. PATENT DOCUMENTS

| | | |
|---|---|---|
| 4,740,912 A | 4/1988 | Whitaker |
| 5,710,884 A | 1/1998 | Dedrick |
| 5,740,549 A | 4/1998 | Reilly et al. |
| 5,761,662 A | 6/1998 | Dasan |
| 5,768,528 A | 6/1998 | Stumm |
| 5,772,446 A | 6/1998 | Rosen |
| 5,813,863 A | 9/1998 | Sloane et al. |
| 5,907,831 A | 5/1999 | Lotvin et al. |
| 5,933,498 A | 8/1999 | Schneck et al. |
| 5,970,231 A | 10/1999 | Crandall |
| 5,972,875 A | 10/1999 | Crutcher et al. |
| 5,974,446 A | 10/1999 | Sonnenreich et al. |
| 5,987,606 A | 11/1999 | Cirasole et al. |
| 6,020,884 A | 2/2000 | MacNaughton et al. |

(Continued)

FOREIGN PATENT DOCUMENTS

| | | |
|---|---|---|
| FR | 2814844 A1 | 10/2000 |
| WO | 2007118231 | 10/2007 |

OTHER PUBLICATIONS

Ashley Lowery, Internet Neighborhood ePALS links world with Edwardsburg, South Bend Tribune, Mar. 14, 2001.

(Continued)

*Primary Examiner* — John B Walsh
(74) *Attorney, Agent, or Firm* — Nelson Mullins Riley & Scarborough LLP (57) ABSTRACT

A method and system to permit the creation of "parent" accounts within a school system's data transmission system which are associated with a parent's child or children who are students in the system. A parent account is capable of creation and access by various levels within the hierarchy of the system and is associated with one or more schools within the community being serviced by the entity providing the servers and community generation implementation engine.

28 Claims, 2 Drawing Sheets

(56) References Cited

U.S. PATENT DOCUMENTS

| | | | |
|---|---|---|---|
| 6,075,968 A | 6/2000 | Morris et al. | |
| 6,085,229 A | 7/2000 | Newman et al. | |
| 6,105,027 A | 8/2000 | Schneider et al. | |
| 6,157,924 A | 12/2000 | Austin | |
| 6,178,407 B1 | 1/2001 | Lotvin et al. | |
| 6,208,995 B1 | 3/2001 | Himmel et al. | |
| 6,233,618 B1 | 5/2001 | Shannon | |
| 6,249,282 B1 | 6/2001 | Sutcliffe et al. | |
| 6,279,013 B1 | 8/2001 | LaMarca et al. | |
| 6,296,487 B1 | 10/2001 | Lotecka | |
| 6,302,698 B1 | 10/2001 | Ziv-El | |
| 6,324,538 B1 | 11/2001 | Wesinger, Jr. et al. | |
| 6,341,960 B1 | 1/2002 | Frasson et al. | |
| 6,363,062 B1 | 3/2002 | Aaronson et al. | |
| 6,370,355 B1 | 4/2002 | Ceretta et al. | |
| 6,374,237 B1 | 4/2002 | Reese | |
| 6,381,444 B1 | 4/2002 | Aggarwal et al. | |
| 6,401,075 B1 | 6/2002 | Mason et al. | |
| 6,438,632 B1 | 8/2002 | Kikugawa | |
| 6,460,036 B1 | 10/2002 | Herz | |
| 6,470,353 B1 | 10/2002 | Yaung et al. | |
| 6,480,885 B1 | 11/2002 | Olivier | |
| 6,554,618 B1 | 4/2003 | Lockwood | |
| 6,560,578 B2 | 5/2003 | Eldering | |
| 6,606,479 B2 * | 8/2003 | Cook et al. | 434/350 |
| 6,658,415 B1 * | 12/2003 | Brown et al. | |
| 6,684,212 B1 | 1/2004 | Day et al. | |
| 6,691,106 B1 | 2/2004 | Sathyanarayan | |
| 6,691,153 B1 | 2/2004 | Hanson et al. | |
| 6,704,320 B1 | 3/2004 | Narvaez et al. | |
| 6,718,369 B1 | 4/2004 | Dutta | |
| 6,725,203 B1 | 4/2004 | Seet et al. | |
| 6,741,980 B1 | 5/2004 | Langseth et al. | |
| 6,757,691 B1 | 6/2004 | Welsh et al. | |
| 6,766,362 B1 | 7/2004 | Miyasaka et al. | |
| 6,807,558 B1 | 10/2004 | Hassett et al. | |
| 6,825,945 B1 | 11/2004 | Silverbrook et al. | |
| 6,826,534 B1 | 11/2004 | Gupta et al. | |
| 6,842,773 B1 | 1/2005 | Ralston et al. | |
| 6,845,273 B1 | 1/2005 | Taylor | |
| 6,892,226 B1 | 5/2005 | Tso et al. | |
| 6,920,617 B2 | 7/2005 | Nitta | |
| 6,954,783 B1 | 10/2005 | Bodwell et al. | |
| 6,973,462 B2 * | 12/2005 | Dattero et al. | |
| 6,988,839 B1 | 1/2006 | Yu | |
| 7,031,651 B2 | 4/2006 | McCormick et al. | |
| 7,032,022 B1 | 4/2006 | Shanumgam et al. | |
| 7,035,926 B1 | 4/2006 | Cohen et al. | |
| 7,120,590 B1 | 10/2006 | Eisen et al. | |
| 7,127,741 B2 | 10/2006 | Bandini et al. | |
| 7,162,522 B2 | 1/2007 | Adar et al. | |
| 7,328,216 B2 | 2/2008 | Hofmann et al. | |
| 7,464,147 B1 | 12/2008 | Fakhouri et al. | |
| 7,577,665 B2 | 8/2009 | Ramer et al. | |
| 7,640,336 B1 * | 12/2009 | Lu et al. | 709/224 |
| 7,765,481 B2 | 7/2010 | Dixon et al. | |
| 2001/0037407 A1 | 11/2001 | Dragulev et al. | |
| 2002/0013836 A1 | 1/2002 | Friedman et al. | |
| 2002/0038246 A1 | 3/2002 | Nagaishi | |
| 2002/0040374 A1 | 4/2002 | Kent | |
| 2002/0049806 A1 * | 4/2002 | Gatz et al. | 709/203 |
| 2002/0064767 A1 | 5/2002 | McCormick et al. | |
| 2002/0100808 A1 | 8/2002 | Norwood et al. | |
| 2002/0119434 A1 | 8/2002 | Beams et al. | |
| 2002/0123334 A1 | 9/2002 | Borger et al. | |
| 2002/0140732 A1 | 10/2002 | Tveskov | |
| 2002/0161770 A1 | 10/2002 | Shapiro et al. | |
| 2002/0168621 A1 * | 11/2002 | Cook et al. | 434/350 |
| 2002/0169782 A1 | 11/2002 | Lehmann et al. | |
| 2002/0169954 A1 | 11/2002 | Bandini et al. | |
| 2002/0174230 A1 | 11/2002 | Gudorf et al. | |
| 2002/0184092 A1 | 12/2002 | Cherry et al. | |
| 2003/0029911 A1 | 2/2003 | Kitayama | |
| 2003/0050986 A1 | 3/2003 | Matthews et al. | |
| 2003/0093518 A1 | 5/2003 | Hiraga | |
| 2003/0110215 A1 | 6/2003 | Joao | |
| 2003/0164849 A1 * | 9/2003 | Barrie et al. | 345/733 |
| 2003/0207245 A1 | 11/2003 | Parker | |
| 2004/0001087 A1 | 1/2004 | Warmus et al. | |
| 2004/0014017 A1 | 1/2004 | Lo | |
| 2004/0030781 A1 | 2/2004 | Etesse et al. | |
| 2004/0039814 A1 | 2/2004 | Crabtree et al. | |
| 2004/0049554 A1 | 3/2004 | Watanabe | |
| 2004/0064515 A1 | 4/2004 | Hockey | |
| 2004/0103118 A1 | 5/2004 | Irving et al. | |
| 2004/0103122 A1 | 5/2004 | Irving et al. | |
| 2004/0103137 A1 | 5/2004 | Irving et al. | |
| 2004/0111423 A1 | 6/2004 | Irving et al. | |
| 2004/0122692 A1 | 6/2004 | Irving et al. | |
| 2004/0128624 A1 | 7/2004 | Arellano et al. | |
| 2004/0145770 A1 | 7/2004 | Nakano et al. | |
| 2004/0167794 A1 | 8/2004 | Shostack | |
| 2004/0186738 A1 | 9/2004 | Reisman | |
| 2004/0205578 A1 | 10/2004 | Wolff et al. | |
| 2005/0014121 A1 | 1/2005 | Eck et al. | |
| 2005/0014122 A1 | 1/2005 | Ruvinsky et al. | |
| 2005/0033657 A1 | 2/2005 | Herrington et al. | |
| 2005/0071328 A1 | 3/2005 | Lawrence | |
| 2005/0079477 A1 | 4/2005 | Diesel et al. | |
| 2005/0105134 A1 | 5/2005 | Moneypenny et al. | |
| 2005/0165743 A1 | 7/2005 | Bharat et al. | |
| 2005/0166143 A1 | 7/2005 | Howell | |
| 2005/0216336 A1 | 9/2005 | Roberts et al. | |
| 2005/0227216 A1 | 10/2005 | Gupta | |
| 2005/0240580 A1 | 10/2005 | Zamir et al. | |
| 2005/0251494 A1 | 11/2005 | Maria Jansen | |
| 2005/0266388 A1 | 12/2005 | Gross et al. | |
| 2005/0288943 A1 | 12/2005 | Wei et al. | |
| 2006/0031087 A1 | 2/2006 | Fox et al. | |
| 2006/0062157 A1 | 3/2006 | Yamamoto | |
| 2006/0115800 A1 | 6/2006 | Daley | |
| 2006/0134593 A1 | 6/2006 | Kalous et al. | |
| 2006/0240856 A1 | 10/2006 | Counts et al. | |
| 2006/0242234 A1 | 10/2006 | Counts et al. | |
| 2006/0246197 A1 | 11/2006 | Kshirsagar et al. | |
| 2006/0248197 A1 | 11/2006 | Evans et al. | |
| 2006/0252547 A1 | 11/2006 | Mizrahi et al. | |
| 2006/0253533 A1 | 11/2006 | Bursztein et al. | |
| 2006/0253572 A1 | 11/2006 | Gomez et al. | |
| 2007/0027973 A1 | 2/2007 | Stein et al. | |
| 2007/0130339 A1 | 6/2007 | Alcorn et al. | |
| 2007/0224585 A1 | 9/2007 | Gerteis et al. | |
| 2007/0231782 A1 | 10/2007 | Ozawa et al. | |
| 2007/0245349 A1 | 10/2007 | Sinn | |
| 2007/0260671 A1 | 11/2007 | Harinstein et al. | |
| 2008/0082480 A1 | 4/2008 | Gounares et al. | |
| 2008/0126476 A1 | 5/2008 | Nicholas et al. | |
| 2009/0030876 A1 | 1/2009 | Hamilton | |

OTHER PUBLICATIONS ePALS Classroom Exchange First to Provide Teacher Monitored Email With Instant Language Translations, PR Newswire, Mar. 14, 2000.
ePALS Classroom Exchange partners with Canada's SchoolNet, Canada NewsWire, Nov. 23, 2000.
MessageLabs: British Government Takes on MessageLabs to Bolster Virus Protection, M2 Presswire, May 16, 2002.
Netopia: Netopia to bring parental control, content filtering and family security services to broadband service providers, M2 Presswire, Jun. 4, 2002.
Safety: Monitoring web access, The Guardian, Oct. 25, 2000, at 7.
Scholastic and ePALS Classroom Exchange Announce Agreement Connecting Global Classrooms, Business Wire, Aug. 10, 2000.
Zoraini Wati Abas, E-mail activities in the classroom, Computimes Malaysia, Apr. 26, 2001.
Portions of the file history of U.S. Appl. No. 10/619,097.
Portions of the file history of U.S. Appl. No. 10/619,098.
Portions of the file history of U.S. Appl. No. 10/619,099.
Portions of the file history of U.S. Appl. No. 10/619,259.
Portions of the file history of U.S. Appl. No. 10/619,101.
United States Patent and Trademark Office, Non-Final Office Action, mailed Mar. 2, 2012, U.S. Appl. No. 13/251,263, filed Oct. 2, 2011, Linda T. Dozier et al.

(56) References Cited

OTHER PUBLICATIONS

United States Patent and Trademark Office, Non-Final Office Action, mailed Apr. 17, 2012, U.S. Appl. No. 11/402,830, filed Apr. 13, 2006, Osmani Gomez et al.

United States Patent and Trademark Office, Final Office Action issued May 7, 2014 in U.S. Appl. No. 10/619,099, filed Jul. 14, 2003, John Irving, et al.

United States Patent and Trademark Office, Final Office Action issued May 8, 2014 in U.S. Appl. No. 10/619,097, filed Jul. 14, 2003, John Irving, et al.

Ormes, S., "An Introduction to Filtering," 2002, www.archive.org, printed Jan. 6, 2014.

RIT, "The Economic Impact of Role-Based Access Control," 2002, National Institute of Standards and Technology.

* cited by examiner

METHOD AND SYSTEM FOR INTERACTIVE, MULTI-USER ELECTRONIC DATA TRANSMISSION IN A MULTI-LEVEL MONITORED AND FILTERED SYSTEM

CLAIM OF PRIORITY

This application is a continuation of U.S. patent application Ser. No. 10/619,098, filed Jul. 14, 2003, by Irving et al., now pending, which claims the benefit of U.S. Patent Application Ser. No. 60/395,405, filed Jul. 13, 2002, both of which are incorporated by reference herein as if set forth verbatim.

BACKGROUND OF THE INVENTION

Global education has become a requirement, not a luxury. Technology integration into a curriculum has become a must. The Internet has become the transmission medium. Connectivity has become the goal. The proliferation of personal computers has permitted virtually every classroom to have the capability to be "wired" and on-line. There is the realization that Internet connectivity can enhance the economic advancement of students and communities and provide a level of information on a broad scale hitherto unknown. In can permit the current generation to leap frog into this century. The failure to provide such connectivity can further exacerbate the split between the haves and the have-nots.

Along with global information access has come the realization that a level of monitoring and control must be exercised in order to keep the information highway from becoming an open sewer. Regular e-mail and open access chat rooms are generally not secure. Although there are some screening tools and blockages that can be employed, as a general matter, the flow of information cannot be adequately controlled in an open environment.

Through community based filtered and monitored systems, such as is described in a Provisional patent application Ser. No. 10/619,259, teachers can set up accounts for themselves and for their classes in order to provide "shared learning" through collaboration. However, this limits the collaborative environment to those who are willing to use the Internet and become part of a community. Moreover, to the extent that there is any financial burden or cost involved with the account, teachers may be reluctant to bear that obligation personally, inasmuch as it is being used for their professional activities. Similarly, establishing such an account may or may not be consistent with the curriculum plans for a particular school or for the particular school system. Classrooms in a wealthier areas may all be interconnected, while those in less affluent parts of a community may not, thus relying on those teachers to bear any economic cost of setting up and maintaining the account, along with the computer necessary to access it.

Provisional patent application Ser. No. 10/619,097 describes a method and system for multi-level monitoring and filtering of data transmissions (Schoolmail) that permits the creation within a school district or school system of a secure "virtual district" with "virtual classrooms", "virtual meeting halls", "virtual teacher conferences" and multiple accounts to permit a hierarchical infrastructure with varying privileges associated with each user name or category. The system provides a universal solution to allowing information flow to both students and educators, while maintaining control of the type and character of material received by students. It also permits internal community or group generation to permit dissemination of information to different levels of educators or administrators on a needs basis. The system can employ common server capability to permit multiple districts to have their individual SchoolMail, while at the same time providing the capability of interaction and connectivity among the districts, based upon screening and search criteria. It can also control the desktop of the personal computers that are on the SchoolMail system to prevent students from getting off and onto an open and uncontrolled system.

Although school systems are coming to the realization that they must provide uniform access to all teachers and administrators within a system, and the capability to communicate with other systems, the cost of setting up the necessary servers, personal computers and information infrastructure can be prohibitive. Maintaining the system can require substantial numbers of dedicated personnel and rapid advances in technology can make a system obsolete before it is even paid for.

Educators are also finding that without the participation of parents in the educational process, teaching is hampered and less effective. Parental involvement is critical on several levels. An involved parent is more likely to push their child to learn and go beyond the minimum requirements of a class session. An involved parent is also more likely to pay for the cost of the added benefit of technological integration into the classroom. However, parental involvement in education an also be seen by administrators and educators as another level of "bureaucracy" to which they have to answer, and which may sometimes become involved in petty matters. There is a need to enhance the educational experience by providing the interactive, connective technological tools for collaborative learning and involving those who ultimately are paying for the tools while, at the same time, preventing the parents from "micro-managing" their child's education or using the information highway to inundate teachers and administrators.

BRIEF DESCRIPTION OF THE FIGURES

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DESCRIPTION OF THE METHOD AND SYSTEM

Figure 1:
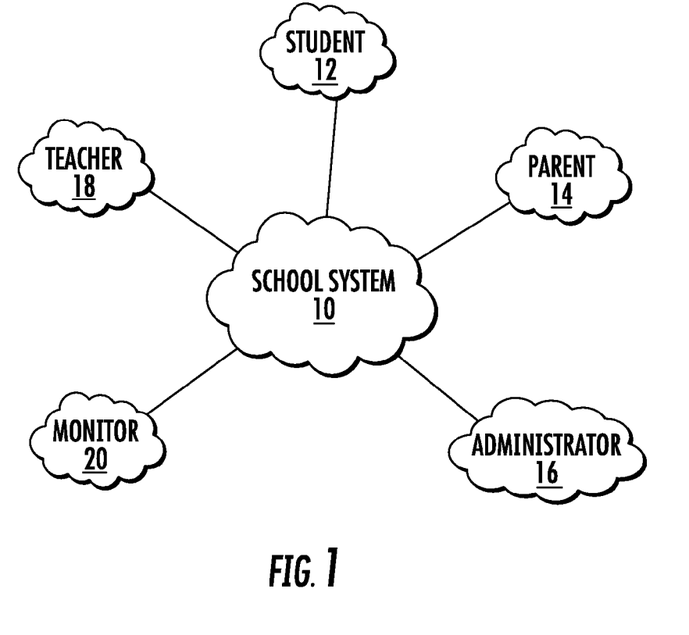
FIG. 1 is a schematic view of a data transmission system of a school system in accordance with an embodiment of the present invention.

FIG. 1 illustrates a data transmission system 10 of a school system comprising a central node and multiple outer nodes. Referring to FIG. 1, the method and system permit the creation of "parent" accounts 14 within a school system's data transmission system 10, which are associated with the parent's child or children who are students 12 in the system. These parent accounts 14 will be capable of being accessed by various levels within the hierarchy of the system and will be associated with one or more schools within the community being serviced by the entity providing the servers and community generation implementation engine. By creating parent accounts 14, a school system can shift the cost of the overall system from a school budget item to a parental expenditure. This will permit the parents to become part of the school community, but not generally a part of the school or district. The parents can, depending on the level determined by the administrator 16, have access to certain aspects of the system, but not to everything that the other users, such as student 12, teacher 18, and monitor 20, may have.

Parents can either be seen by the system as a new internal category who are a designated group and can be treated as such by both the system and the administrator who determines access, or the system can have a vertical category coded into the operational software. The former approach permits the addition of parents by the administrator as a defined new group with a new accounts as the accounts are needed. This model also permits the administrator, in the hierarchical system, to grant or deny levels of access to parents, in much the same way as the administrator can grant of deny access to teachers and students for monitoring and other purposes. For example, the parents can be given access to grade records and homework assignments, but not the private folders of their children. Those can be accessed by the student and the responsible monitor. The access can also be altered, if the administrator deems it appropriate.

An additional benefit is that the schools can work with the service provider and, through economies, can obtain both direct and indirect project funding. The parental accounts can provide sufficient funding to permit the school to finance additional computers and provide accounts to the students. The service provider can also provide parental files and information sharing which can enhance the collaborative learning experience by drawing the parents into the "virtual classroom" as participants, where appropriate. By integrating the parents into the "virtual school", they become more involved in their child's education and further enhance the educational process.

The system is also designed to maintain the security of the community. Parents must only have access to their own children's information and there must be security to prevent breaches of privacy. No parent should be allowed to obtain records that would violate a student's right to privacy. The parents cannot be allowed to interfere with teacher or administrator directed activities, nor should they be able to contact or communicate with the teacher unless requested to do so on specific matters. Parents should not be able to generate "education spam" and waste a teacher's valuable time, but should be able to address legitimate concerns in an efficient manner. Having a parental component to a monitored school data transmission system accomplished these objectives and others.

Parental Registration

Figure 2:
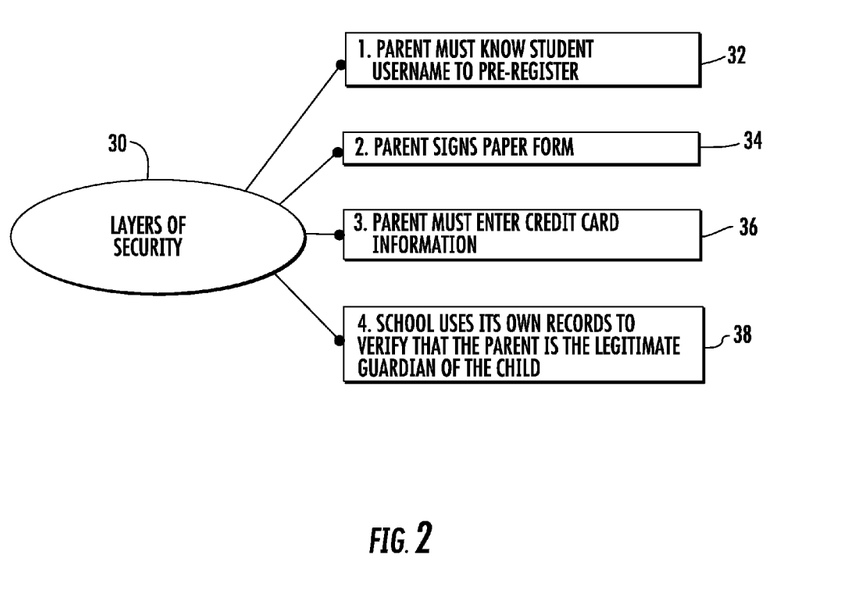
FIG. 2 is a schematic view of exemplary layers of security of a data transmission system in accordance with an embodiment of the present invention.

FIG. 2 is an illustration of various exemplary layers of security 30 of the data transmission system of a school system. Referring to FIG. 2, parent accounts may be created after the student accounts have been created or may be created simultaneously. Because they are linked accounts, the absence of a student account will prevent a parent account from being activated. The onus for the authentication of parent accounts falls upon the school or district—this enables them to use their own records to verify the legitimacy of any application, as shown at block 38.

1. Parents are informed of the ability to create parent accounts that are linked to their students. One method for registration is to give the parent the uniform resource locator ("URL") they should visit to pre-register. The district user name can be made a part of the URL so that the parent will not wander into a registration area for another school by accident or intentionally.

2. Parents visit site to pre-register. They indicate to which students they should be associated (using student's usernames as shown at block 32).

3. Parents enter information for all parent accounts. This would permit a parent to create an account for a grandparent, or separate accounts for a mother and a father. The particulars of the number of accounts vary and are a function of the cost of maintaining the accounts and the people schools permit to be associated with a student.

4. Parents enter information to pay for account(s). This could be in the form of a credit card, or direct deduction from a checking account, by way of example as shown at block 36.

5. Parents receive confirmation code and details in a printable form and are told to print or save it. The parent must get the signed code to the school in a secure way. This can be up to the administrator/school/board, etc. to determine. One method is to have parents physically come in to the school with ID. Alternatively, a parent an mail a signed form in with the code, or bring it in with the student, as shown at block 34. Exact steps to take for each scenario should be designed to make it as easy as possible for parents to implement them while maintaining the security of the system.

6. Administrator activates parent account(s) using the code or parent name. Administrators may activate only those accounts that are in their records as being associated with the student, at their discretion. If the parent has entered someone else's name, the account would not be created by the administrator and a security log will be made to show record the attempt. In addition, the administrator must verify that the student accounts the parent has chosen should in fact be associated with them. Thus, for example, a parent that has been barred from seeing their child would not be able to set up an account linked to the child's school account.

7. Parents logging in before the account is activated will receive a status message telling them the account is not yet active. If they are the primary contact (the one who did the initial registration), they will be able to view/edit the account details.

8. If a 'parent' fails to correctly identify the student that should be associated to them more than a certain number of times, their access is blocked so they will keep guessing and eventually guess correctly. Similarly, parents attempting to associate a student account to them that has already been associated to another parent will trigger an alarm to the administrator informing them of the discrepancy.

Administrator Functions

The administrators that activate parent accounts must be designated in the hierarchical system and be associated with the students and the school in which the students are located. The administrators can make changes to the settings for those users.

Another feature of the system requires that parents have a separate authentication and registration process for each school that their children attend (though the process takes only one step for the parent). Thus, it is possible for parent accounts to be approved for association with a student at one school, but not at another.

Parent accounts are activated the first time an administrator at one school approves them. Subsequently, an interface is used to set up the association at other schools—but these administrators cannot deactivate a parent account that is active in another school. Generally, only administrators who have access to all of the schools associated with a parent will be able to completely deactivate parent accounts. Administrators with more restricted access may only be able to remove an association between a student and parent.

Accounts Interface

The system may employ a new internal categorization similar to how teachers/students are treated, so they can be seen as a group by SchoolMail administrative tools. Thus, each school that decides to have parents as part of the collaborative learning process can have a category established without changes in the code or additional software or hardware. It requires only that the group be recognized within the hierarchy as a new entity with access determined by the administrator having control over that level of the hierarchy.

The parent accounts may be treated differently from other accounts. For example, it may be desirable to be able to store the additional information requested, such as the address and phone number, instead of using the contact information associated to the school or license to which the accounts are assigned (as it is with the other account types). Parents logging in before their account have been activated can see the status of their application—their account is not active, but login is still permitted to provide this access.

As yet a further part of the system, administrators with access will be able to see and manipulate the relationship between students and their parents. The parent interface will show a "children' or similarly designated column (in the same way that students are linked to their monitors), which can be used to show all of the children associated to that parent.

Because of the overall flexibility of the system, some schools will have parent accounts, and some will not. Yet the system will function on the same network and server set-up in order to permit the economical and repaid transmittal of data, while still maintaining the monitoring and filtering function that is important in a secure school environment.

Changes to Appearance

Front Page

It is a further advantage that administrators will be able to control the look and feel of the parent interface separately from teachers and students. A special school categorization "Parents" can make this possible with minimal difficulty while still maintaining the integrity and security of the system and its hierarchical nature.

Usage Reports

It is also useful for the school administrators to have information as to how many parent accounts have been pre-registered, activated, and are currently active. This will provide information to the school system as to the parental involvement as well as the actual usage by the parents. Logging functions can be incorporated into the system architecture and can be made accessible to only those administrators with a need for the information.

Parent User Interface

The user interface may need to be separate from teacher/student, because it may be used not only for administrators to send a parent-only message, but may eventually also contain ad banners and possibly an entire private label. Administrators can edit the front page appearance for the "Parent" interface the same way they edit different schools.

Logs

As a further part of the internal security established within the system, there is an automatic logging function that can inform the administrators about anything unusual that happens. For example, if a parent tries to associate a student to them that someone else has already identified as their child, an alert will be sent to the administrator to inform them of the situation.

Linking Students/Teachers/Parents

The system also permits the linking of students, teachers, and parents where the administrator has determined that the linkage would be beneficial. In order to permit this linkage, the current relationship between parents and teachers should necessarily reflect actual teacher/student relationships in the school. The system will allow teachers access to the parents of their students if the system contains relationships for which teachers teach which students. This aspect requires the administrator or their designee to either input teacher/student relationships at the time that a group or class is registered or created, or with a group manager type application where the teachers find their students and select them. This would allow special access by teachers to parents and would allow a teacher to broadcast to a parent, or send files to a parent's file sharing folder.

Group Manager

A group manager is useful throughout the system, but most specifically for the parent component. It is used to allow teachers to associate themselves with all of their students, which in turn would associate them with their students' parents. By making this association, it will be easy for teachers to contact all of the parents of their students.

File Storage and Sharing

File sharing allows all users associated with a community access to teacher/administrator shared folders. It is possible to modify file sharing to allow sharing information with parents yet restrict access to folders that are intended for school use.

Parent Private Folder

Like all users, parents have their own private folder. The system will easily allow teachers/administrators to push files to groups. At the same time, they could send information to the private folders of parents associated with their students.

E-Mail Broadcast

Email Broadcast enables users with sufficient privilege to send a single email message to a number of users within their community matching certain search criteria.

Although the system's interface can be limited to contacting teachers and students, the system can be adapted to make the account type definition dynamic depending on those available.

The system is capable of permitting teachers with administrative clearance to send an email to a group of recipients, and so allow contact to their students' parents only (see above) or all parents, or to anyone in the license. (This is contingent on the licensee having established the relationship between teachers and students). This option can permit the administrator to designate certain teachers to undertake broadcast responsibilities along with their individual student contacts.

The system is also able to make it possible for E-mail Broadcast to be used by other account types as well. Each account type could have a list of other accounts they can reach, and a setting to say whether or not they can broadcast. If they cannot broadcast, the tool may be employed as a directory search. These settings can be configurable by administrators. Examples of such broadcasts are:

Administrators
  Find anyone in schools to which they are assigned.
Teachers
  Find anyone in schools to which they are assigned.
Parents
  Find teachers of their children.
Students
  Find teachers, students, administrators in their school, but not permit a general broadcast.

This would be an example of the search function rather than the broadcast function.

The "reply-to" address used for the broadcast can be customized, preventing a straight reply to a message from going to the originator. This is most useful in the case of announcements sent by the school, when an email address for further information would be more appropriate than the address of the teacher or administrator who sent the notice.

Banner Server

The appeal of parent accounts with their own interface is that they can be used to push sponsorship that will not reach teachers or students and thus not pollute the "virtual schoolroom". A flexible, easily managed banner server which may be managed by the entity hosting the system is on alternative. The administrators can also be given this responsibility. The degree of flexibility permits various people, both within and associated with the system hierarchy to assume the role.

Parental Monitoring of Children

It is also possible for the system to be configured to make parents responsible for their children. The system may be configured to allow parents to become the monitors for their children at the time of registration, at the discretion of the administrators.

Option for Parental/Shared Monitoring

Another feature permits the use of multiple monitors or to send copies of relevant messages to the parents at the administrators' discretion.

Calendaring

The systems' broadcast capabilities also permit the showing of schedules to parents, inform them of homework assignments, etc.

Quick Polls

Because the community is controlled by the administrator and has a commonality, it is possible to assess community interest in topics of administrators' choosing by conducting polls to all subscribing parents.

Parent Generated Profiles

Because the collaborative process of shared learning is not confined to the classroom and the teachers, the system permits parents to be able to create profiles. The administrator can determine the level at which the parent profile will be available, and with community moderation, parental profiles could be written in a manner appropriate to the closed community that would have access to them.

What is claimed is:

1. A method for providing users with access to a transmission system comprising at least one server and associated with a school system comprising the steps of:
  creating, at the at least one server, a parent account of the transmission system by a first of said users, wherein said first user is associated with a first hierarchical level of the transmission system;
  associating said parent account with a family member;
  associating, at the at least one server, said parent account with a student account of the transmission system, wherein said student account is associated with a student, said family member is associated with said student, and said student is associated with the school system;
  verifying said parent account should be associated to said student account by a second of said users, wherein said second user is associated with a second hierarchical level of the transmission system;
  storing on the at least one server data associated with said student account, wherein each piece of said data is categorized by a type;
  providing said parent account with access to said data, wherein said access is dependent upon said association of said family member with said student and upon said type of piece of said data, so that the at least one server provides said parent account with access to certain of said data associated with said student account of certain category types and prevents said parent account from accessing certain of said data associated with said student account of other category types to which said student account has access, and wherein said access is managed by any of the users associated with said second hierarchical level.

2. The method of claim 1 further comprising verifying said family member should be associated with said parent account.

3. The method of claim 1 wherein said family member is a mother of said student.

4. The method of claim 1 wherein said family member is a grandparent of said student.

5. The method of claim 1 further comprising:
  providing said family member with a uniform resource locator; and
  registering said parent account by said family member.

6. The method of claim 1 further comprising accepting a payment for said parent account, wherein said verifying said parent account is based on said payment.

7. The method of claim 1 further comprising:
  sending a confirmation code to said family member, said confirmation code is associated with said parent account; and
  transmitting said confirmation code to said second user by said family member, wherein said verifying said parent account is based on said confirmation code.

8. The method of claim 1 wherein said verifying said parent account is based on a receipt of a form signed by said family member.

9. The method of claim 1 further comprising:
  receiving at least one attempt to register said parent account by an unauthorized user; and
  blocking said unauthorized user from the transmission system based on said at least one attempt.

10. The method of claim 1 further comprising:
associating a first access to a first set of certain aspects of the transmission system;
associating a second access to a second set of certain aspects of the transmission system; and
providing said parent account with said first access.

11. The method of claim 10 further comprising preventing said parent account from said second access.

12. The method of claim 11 wherein said second user determines said first access, said second access, and said preventing said parent account from said second access.

13. The method of claim 10 further comprising providing said parent account with said second access.

14. The method of claim 13 wherein said second access includes an ability to send an email broadcast to a subset of the users, said subset of the users exhibiting a set of criteria matching a set of specific search criteria.

15. The method of claim 10 further comprising:
creating a teacher account of the transmission system;
associating a teacher with said teacher account;
associating said teacher account with said student account, wherein said teacher is associated with said student;
associating said teacher account with said parent account that is associated with said student account; and
providing said teacher account with said first access and said second access.

16. The method of claim 15 wherein said teacher account is associated with said second hierarchical level.

17. The method of claim 1 further comprising sending an advertisement to said parent account via the transmission system.

18. The method of claim 1 further comprising:
reporting all activity by each said user to said second user; and
reporting all associations of each said user to said second user.

19. An electronic computer system accessible by users associated with a school system comprising:
an administrator account associated with a first hierarchical level of the electronic computer system and stored on a server of the electronic computer system, wherein said administrator account is associated with an administrator located at a school within the school system;
a student account associated with a second hierarchical level of the electronic computer system and stored on the server, wherein said student account is associated with a student that attends said school; and
a parent account associated with a third hierarchical level of the electronic computer system and stored on the server, wherein said parent account is associated with a family member,
wherein the users associated with said first hierarchical level manage the users associated with said second hierarchical level and said third hierarchical level, wherein access by the parent account to data associated with the student account is based upon whether there is a relationship between the family member and the student and upon a type of said data being accessed, so that the electronic computer system provides said parent account with access to certain of said data associated with said student account of certain category types and prevents said parent account from accessing certain of said data associated with said student account of other category types to which said student account has access.

20. The electronic computer system of claim 19 further comprising:
a teacher account associated with a fourth hierarchical level of the electronic computer system, wherein said teacher account is associated with a teacher of said school, said teacher being associated with said student,
wherein the users associated with said first hierarchical level manage the users associated with said fourth hierarchical level, and
the users associated with said fourth hierarchical level manage the users associated with said second hierarchical level and said third hierarchical level.

21. The electronic computer system of claim 20 further comprising:
a first aspect of the electronics computer system associated with said student account; and
a second aspect of the electronics computer system associated with said student account;
wherein said student account and said teacher account being configured to access said first aspect and said second aspect, and
said parent account being configured to access said first aspect and to be prevented access to said second aspect.

22. The electronic computer system of claim 21 wherein said first aspect is a plurality of homework assignments, and said second aspect is a private folder.

23. The electronic computer system of claim 20 further comprising a virtual classroom configured to allow an interaction between said parent account, said student account, and said teacher account.

24. The electronic computer system of claim 20 further comprising a virtual conference configured to allow an interaction between said parent account and said teacher account.

25. An online electronic computer system hosted by at least one server and accessible via a network by a plurality of users utilizing at least one computer, the system comprising:
an administrator account defined at the server and associated with an administrator;
a first user account defined at the server and associated with a first of the plurality of users, the first user account being associated with data stored by the at least one server, wherein each piece of data associated with the first user is defined by a data type; and
a second user account defined at the server and associated with a second of the plurality of users, wherein the server stores data representative of a relationship between the first and second users outside of the online electronic computer system;
wherein the administrator account assigns to the second user account a level of access to the data associated with the first user account, wherein the level of access is based upon the relationship and upon the data type, so that the level of access to the data provides the second user account with access to data associated with the first user account defined by certain data types and prevents the second user account from accessing data associated with the first user account defined by other data types to which said first user account has access.

26. A method for providing users with access to a transmission system comprising at least one server and associated with a school system comprising the steps of:
creating, at the at least one server, a parent account of the transmission system by a first of said users, wherein said first user is associated with a first hierarchical level of the transmission system;

associating said parent account with a family member;

associating, at the at least one server, said parent account with a student account of the transmission system, wherein said student account is associated with a student, said family member is associated with said student, and said student is associated with the school system;

verifying said parent account should be associated to said student account by a second of said users, wherein said second user is associated with a second hierarchical level of the transmission system;

storing on the at least one server data associated with said student account and that is accessible by said student account, wherein each piece of said data is categorized by a type;

providing said parent account with access to said data, wherein said access is dependent upon said association of said family member with said student and upon said type of piece of said data, so that the at least one server provides said parent account with access to certain of said data associated with said student account of certain category types and prevents said parent account from accessing certain of said data associated with said student account of other category types to which said student account has access, and wherein said access is managed by any of the users associated with said second hierarchical level.

27. An electronic computer system accessible by users associated with a school system comprising:

an administrator account associated with a first hierarchical level of the electronic computer system and stored on a server of the electronic computer system, wherein said administrator account is associated with an administrator located at a school within the school system;

a student account associated with a second hierarchical level of the electronic computer system and stored on the server, wherein said student account is associated with a student that attends said school; and a parent account associated with a third hierarchical level of the electronic computer system and stored on the server, wherein said parent account is associated with a family member, wherein the users associated with said first hierarchical level manage the users associated with said second hierarchical level and said third hierarchical level, wherein access by the parent account to data associated with the student account that is accessible by the student account is based upon whether there is a relationship between the family member and the student and upon a type of said data being accessed, so that the electronic computer system provides said parent account with access to certain of said data associated with said student account of certain category types and prevents said parent account from accessing certain of said data associated with said student account of other category types to which said student account has access.

28. An online electronic computer system hosted by at least one server and accessible via a network by a plurality of users utilizing at least one computer, the system comprising:

an administrator account defined at the server and associated with an administrator;

a first user account defined at the server and associated with a first of the plurality of users, the first user account being associated with data stored by the at least one server and that is accessible by the first user account, wherein each piece of data associated with the first user is defined by a data type; and a second user account defined at the server and associated with a second of the plurality of users, wherein the server stores data representative of a relationship between the first and second users outside of the online electronic computer system;

wherein the administrator account assigns to the second user a level of access to the data associated with the first user account, wherein the level of access is based upon the relationship and upon the data type, so that the level of access to the data provides the second user account with access to data associated with the first user account defined by certain data types and prevents the second user account from accessing data associated with the first user account defined by other data types to which said first user account has access.

* * * * *